United States Patent

[11] 3,572,530

| [72] | Inventors | Frederick F. Ohntrup<br>Plymouth Meeting;<br>Russell A. Cornwall, Holland, Pa. |
|---|---|---|
| [21] | Appl. No. | 816,735 |
| [22] | Filed | Apr. 16, 1969 |
| [45] | Patented | Mar. 30, 1971 |
| [73] | Assignee | Eaton Yale & Towne Inc.<br>Cleveland, Ohio |

[54] INDUSTRIAL TRUCK
8 Claims, 10 Drawing Figs.

| [52] | U.S. Cl. | 217/730 |
|---|---|---|
| [51] | Int. Cl. | B66f 9/14 |
| [50] | Field of Search | 214/730, 731 |

[56] References Cited
UNITED STATES PATENTS

| 3,106,305 | 10/1963 | Gehring | 214/730 |
|---|---|---|---|
| 3,356,241 | 12/1967 | Varilek | 214/731 |

*Primary Examiner*—Robert G. Sheridan
*Attorney*—Teagno & Toddy

ABSTRACT: In an industrial truck a carriage is mounted for vertical movement on a pair of spaced uprights. An arm base roll is mounted on said carriage for movement transversely of the truck. A load arm rotates on said base on a generally vertical axis so as to be movably positionable with respect to an axis extending transversely of the truck. A load carrier is pivoted on a generally vertical axis at the end of the load arm opposite its pivot on the arm base. By rotating both the load carrier and the load arm, a load on the carrier may be moved to one side or the other of the truck and also forwardly, without at any time moving the load relatively to the truck to a position where it will greatly effect the stability of the truck.

INVENTOR.
BY Frederick F. Ohntrup &
Russell A. Cornwall
Teagno & Toddy

Patented March 30, 1971

INVENTOR.
FREDERICK F. OHNTRUP &
RUSSELL A. CORNWALL
BY Teagno & Toddy

Patented March 30, 1971 3,572,530

INVENTOR.
FREDERICK F. OHNTRUP &
RUSSELL A. CORNWALL
BY Taogro & Toddy

INVENTOR.
FREDERICK F. OHNTRUP &
RUSSELL A. CORNWALL
BY Teagno & Toddy

INDUSTRIAL TRUCK

This invention relates to an industrial truck of the type equipped with an upright, which forms what is frequently termed a mast, and a load-lifting carriage mounted for vertical movement on the mast.

Generally, a load-handling device will be mounted on the carriage for actual contact with a load to be lifted, moved or stored. In recent years, there has been considerable demand for a truck of this class in which forks or other load-accepting means are adapted for movement with the carriage and also relatively to the carriage so that a load may be accepted or deposited forwardly of the truck or to one side or the other of the longitudinal axis of the truck. As an example, the operator of a truck of this class will frequently wish to move down a relatively narrow aisle and pick up a load at one side of the aisle. He will then wish to manipulate the load so that it extends forwardly of the truck to be deposited forwardly of the truck through the movement of the truck in its longitudinal axis.

Industrial trucks of the particular class are well known in the art, and numerous patents have issued covering constructions of such trucks. However, so far as we are aware, no one has contributed a truck of the particular class that is entirely commercially acceptable. This is due to the fact that in trucks of this class, when the load is positioned forwardly of the truck, it is so far forward, that it renders the truck relatively unstable unless extremely heavy counterweights are applied to the truck, or unless the truck is lengthened unduly to compensate for the overhang of the load.

Furthermore, in a truck of the particular class, when a load is accepted at one side of the truck, it again renders the truck unstable. Further, when the load is moved from a position facing to one side of the longitudinal axis of the truck, to a position forwardly of the truck, or visa versa, the swinging of the load takes place at such distance from the main body of the truck, that the truck is rendered unstable. Thus, it may even require outriggers to compensate for its lack of stability, all of which is extremely undesirable as those skilled in the art will appreciate.

In an application that was filed earlier by one of the assignees of the present invention, U.S. Ser. No. 678,621, filed Oct. 27, 1967, now U.S. Pat. No. 3,460,699, there is shown and described a truck of the particular class to which we have just referred, but in which stability is contributed by novel features. Thus the previous invention utilized a relatively narrow mast comprising an upright. Because the upright is closely positioned relatively to the center of the truck, contributing a relatively narrow mast, it is possible to move the mast rearwardly of the truck through a relatively narrow opening formed in the truck. This brings the load forks or the load carriage against the forward end of the truck with a minimum overhang of the load.

Actually, in the previous invention the narrow opening was formed in the longitudinal axis of the truck, and the carriage was further formed so that it may ride over part of the main frame of the truck when required. The basic feature of the concept resides in the movement of the entire mast rearwardly together with the load so as to bring the load into a position of minimum overhang relatively to the forward wheels or the front end of the truck, all as those skilled in the art will appreciate.

Also in the earlier invention, the load forks or load carriage of the truck are adapted to rotate relatively to a load arm that is formed as part of the carriage of the truck and is adapted to move vertically on the mast. Obviously, by retracting the mast inwardly of the truck, with the load facing either to the right or to the left, the side of the load is brought into close juxtaposed relation to the forward end of the truck. Again, it is the retraction of the entire mast that contributes to the stability of the load.

While we attach great importance to the contribution that is made to the art through the construction of the earlier application, we believe that the concept that we shall disclose in this application, is a considerable improvement. Thus, the earlier invention requires the utilization of a relatively narrow mast. Obviously, a narrow mast has considerable limitations, but was desirable in the earlier construction in order to make possible the retraction of the mast. In our construction to be disclosed in this application, we are able to use a standard mast of standard width since retraction of the mast is no longer required in order to obtain the necessary stability.

Thus, as a feature of our invention, we utilize carriage extending preferably the full width of the truck and on this carriage we mount a transversely moving arm base. On this transversely moving arm base we mount a load arm, this load arm being adapted for rotation on the arm base to place the load arm transversely of the truck facing either to the right or to the left, or in intermediate positions. At the end of the load arm, we mount a load carrier, which in the application here to be described, will be a pair of load forks. These load forks are adapted for rotation relatively to the end of the load arm as in the earlier application referred to above, so as to face either to the right or to the left or forwardly in axial alignment with the truck. In this manner, the forks may accept or deposit a load at either side of the truck or forwardly of the truck, as will appear presently.

In an arrangement such as we have outlined, it is possible, through rotation of the load forks relatively to the load arm, while the load arm is itself being rotated relatively to the arm base, to manipulate the load while maintaining it in an extremely stable position relatively to the truck. Thus, with the load arm positioned transversely of the truck and with the load forks facing forwardly of the truck, we are able to manipulate the load forks so that the load will be positioned facing towards one side of the truck with the load arm extending longitudinally of the truck in the longitudinal axis thereof, and with the side of the load closely juxtaposed to the end of the truck so as to contribute maximum stability.

As a further feature of our invention, we are able to manipulate the load as just indicated, while maintaining the entire load at all times during its manipulation in extremely close relation to the truck main frame.

As a further particular feature of this invention we have arranged power means for moving the load forks and load arm so that the load arm may be rotated simultaneously with rotation of the load forks relatively to the end of the load arm. In this way, the load may be automatically manipulated as outlined while always maintaining the load closely to the forward end of the truck. Preferably, we arrange to so manipulate the parts through the utilization of a novel arrangement of hydraulic motors to which operating fluid is supplied under pressure, with volume controls determining the speed of rotation of the motors and the consequent speed of movement of the load arm and the load forks.

We have thus outlined rather broadly the more important features of our invention in order that the detailed description thereof that follows may be better understood, and in order that our contribution to the art may be better appreciated. There are, of course, additional features of our invention that will be described hereinafter and which will form the subject of the claims appended hereto. Those skilled in the art will appreciate that the conception on which our disclosure is based may readily be utilized as a basis for the designing of other structures for carrying out the several purposes of our invention.

Referring now to the drawings.

Figure 1:
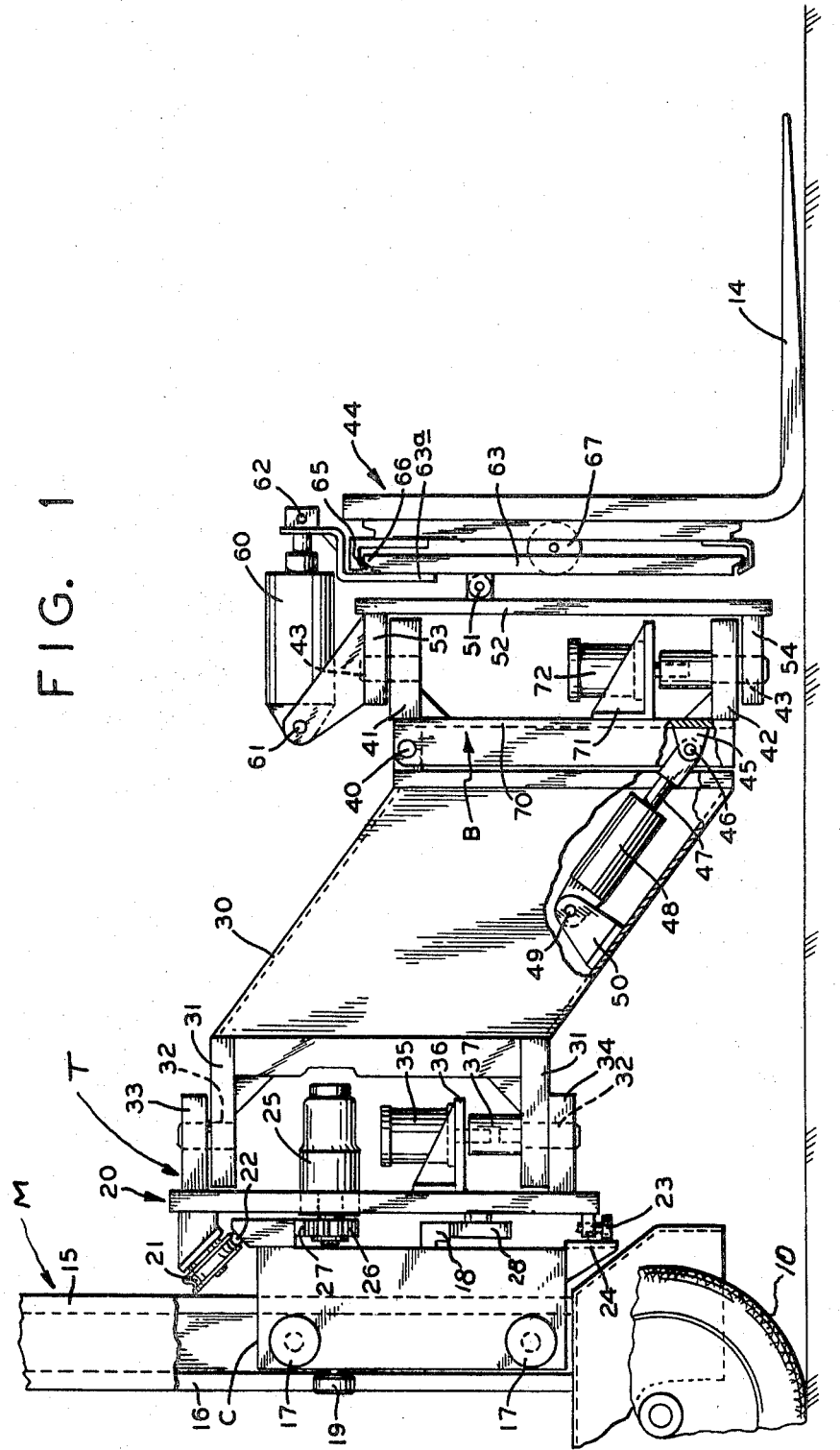
FIG. 1 is a vertical side elevation of part of the front end of an industrial truck showing my invention applied thereto.
Figure 2:
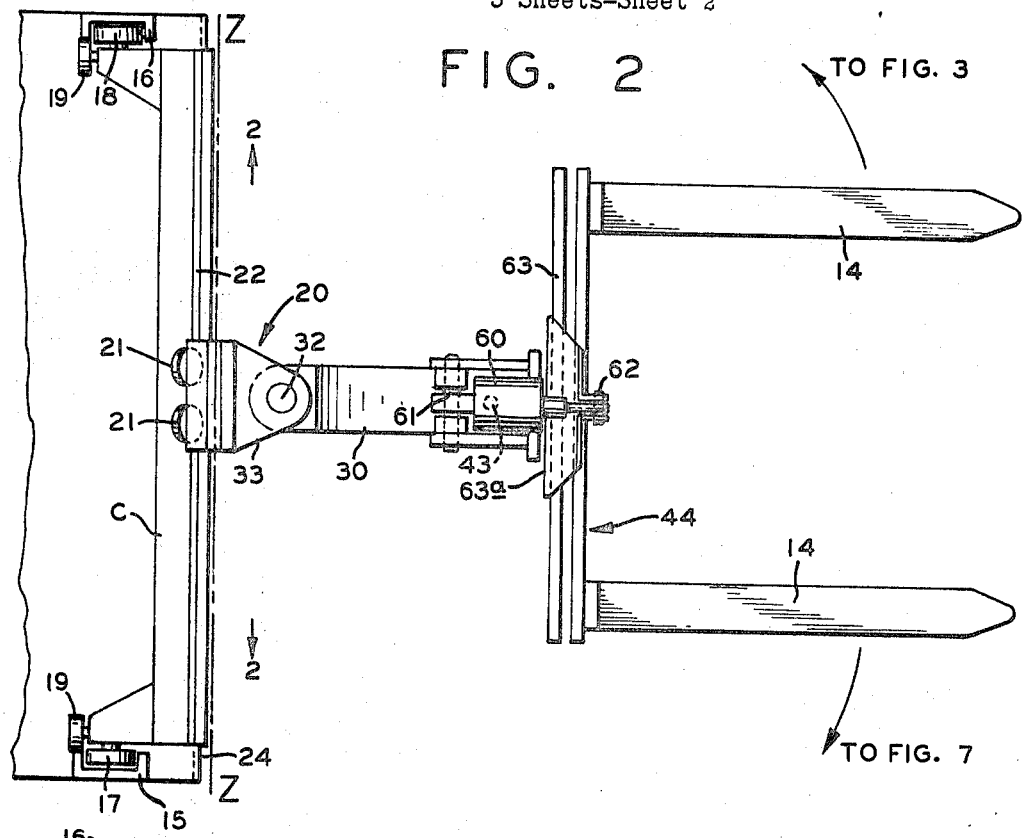
FIG. 2 is a plan view of the construction shown in FIG. 1.
Figure 3:
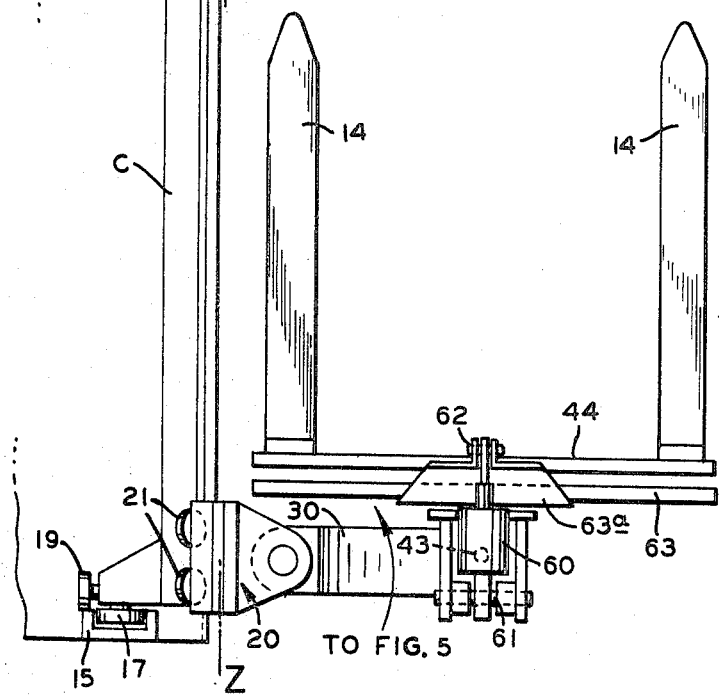
FIG. 3 is a view of the parts of FIG. 2 with the load forks rotated 90°.
Figure 4:
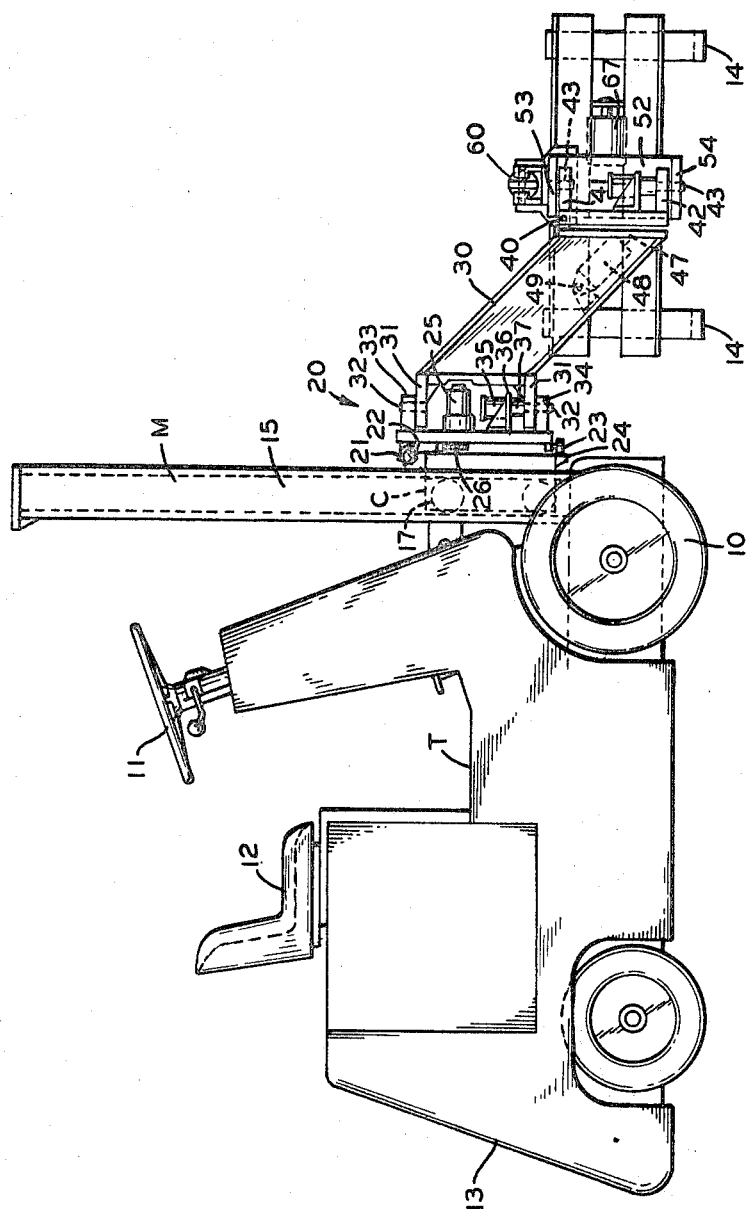
FIG. 4 is a vertical elevation similar to FIG. 1 but showing the entire truck, while the forks are in the position to which they have been rotated in FIG. 3.

Referring now more particularly to the drawings, and especially FIGS. 1 and 4, the industrial truck to which our invention is applied may be indicated generally by the reference letter T, and may be of any usual construction. In the modification shown, the truck T has forward driving and steered wheels 10, that are controlled by a usual steering wheel 11 to be actuated by an operator seated at 12. At 13 there is indicated the counterweight that is required to balance a load that may be applied to the load forks 14 that are part of a load-lifting and manipulating assembly that is mounted for movement on what is termed a mast M. The mast M, as is best shown in FIGS. 2 and 3, is formed of spaced uprights 15 and 16, that in the form we illustrate, are open channels.

For the sake of simplicity we have shown only two of these channels, but actually, in many industrial trucks, there may be two, three and four interlocking or nested uprights. The purpose of our showing is merely to illustrate the fact that the mast M may be formed of uprights that are spaced, with one upright at one side of the center of the industrial truck, and the other upright at the other side thereof.

In FIG. 1 a carriage C is shown vertically movable relatively to the upright 15 through a pair of rollers 17 supported on the carriage and adapted to roll in the channel of upright 15. Obviously, similar rollers 18 are positioned at the other side of carriage C and mount the carriage C for movement in the channel of upright 16. The carriage C may also have transversely positioned rollers 19 that operate against the flanges of the channel uprights 15 and 16 for accepting side thrust and thereby preventing the cocking and locking of the carriage relatively to the uprights 15 and 16.

What we term the arm base of our invention, is designated by the reference numeral 20. This arm base 20 has a pair of rollers 21 mounted at an angle as well shown in FIGS. 1 and 4, whereby it may ride on a guide ridge 22 integral with the carriage C and extending transversely of the carriage. A pair of rollers 28 are similarly mounted on the arm base 20 and bear on a support bar 18 mounted on the carriage C. The rollers 25 cooperate with the rollers 21 to prevent tipping of the arm base 20 due to loads imposed thereon when the load is supported to the side of the truck T in a manner to be described hereinafter. At its lower edge the arm base 20 has a pair of rollers 23 that are adapted to rotate against a transversely extending vertically positioned plate 24 integral with carriage C. It is obvious that rollers 28, 23 and 21 will well maintain the arm base 20 in the position illustrated in FIGS. 1 and 2 for movement transversely of the carriage C as designated by the arrows 2-2 in FIG. 2.

The arm base 20 carries thereon a hydraulic motor of any conventional type as well illustrated at 25 in FIG. 1. The motor 25 has secured to its drive shaft a gear 26 this is in operative coaction with a rack 27 fixed to the carriage C, the teeth of the rack extending vertically downwardly so as to interlock with the teeth 26 of the hydraulic motor 25. It is obvious that rotation of the motor clockwise or counterclockwise will bring about a movement of the arm base 20 transversely relatively to the carriage C in the direction of the two arrows 2-2.

What we term a load arm is designated by reference numeral 30 in the several FIGS. This load arm is formed with a pair of relatively horizontal beams or brackets 31 which, through shafts 32 are mounted for rotation relatively to upper and lower brackets 33, 34 of the arm base 20. A hydraulic motor 35 is supported on a bracket 36 secured to the arm base 20, and through a suitable connection designated generally by the numeral 37, is adapted to effect rotation of the arm 30 relatively to the arm base 20, on the upper and lower pivot shafts 32.

At the forward end of the load arm 30 there is pivoted at 40 a bracket B having an upper support beam 41 and lower support beam 42, on which through suitable pivots 43 there is pivoted the load fork assembly designated generally by numeral 44. The bracket B has an ear 45, which through a pin 46 is pivoted to the end of a piston 47 of a hydraulic ram 48 that is in turn pivoted at 49 to ears 50 integral with the load arm 30. Through the use of the particular mechanism, the bracket B together with its upper and lower beams 41 and 42, may be pivoted on the axis of the horizontal pivot 40. This is required frequently in order to bring about a levelling movement of the forks 14 of the fork assembly 44 as those skilled in the art will appreciate.

Frequently, it is desirable to obtain further tilting or pivotal movement of the forks 14 of the fork assembly 44, and for this purpose the fork assembly 44 may be pivoted at 51 to a plate 52 that is integral with upper and lower brackets 53 and 54, these being the two bearing members through which the load fork assembly 44 is pivoted relatively to the upper and lower beams 41 and 42 of bracket B. A hydraulic ram 60 is pivoted at 61 to the upper bracket 53, and at 62 to a part 63a that is integral with a plate 63 whereby the fork assembly is pivoted at 51 to plate 52. Therefore, the hydraulic ram 60 may pivot the entire fork assembly 44 on the pivot axis 51 as is rather clear.

We prefer also to use an additional side-shifting mechanism, in addition to the shift provided by motor 25 of arm base 20 along carriage C, and for this purpose the load forks 14 have a bearing member 65 through which the forks 14 may be slidable mounted on an upper edge 66 of the plate 63. This additional side shifting is contributed by a side-shifting motor 67 operatively mounted between the plate 63 and the load forks 14. We have thus illustrated and described generally the side shifting of the forks 14 of the load fork assembly 44, with pivotal movement at 51, in order to further illustrate the versatility of our invention.

A support bracket 71 is welded to a plate 70 of bracket B, and on this support bracket 71 there is mounted a hydraulic motor 72 similar to the hydraulic motor 35. Motor 72 is utilized for rotating the load fork assembly 44 relatively to the load arm 30 on the axis of the upper and lower shafts 43 just as motor 35 rotates the load arm 30 relatively to arm base 20.

At this point, it will be well to indicate that for the purposes of our invention it is well to know that the carriage C moves vertically upwardly and downwardly relatively to the spaced uprights 15 and 16. Also, that the carriage C, through the rollers 21 and 23, supports the arm base 20 for transverse movement in the direction of the arrows 2-2 of FIG. 2 and that this movement is contributed by a hydraulic motor 25. In addition it is necessary to appreciate that the load arm 30 may rotate relatively to the arm base 20 on pivots 32 with the pivotal movement contributed by the hydraulic motor 35 carried by the arm base 20. It is then necessary to know further that the entire load fork assembly 44, including the forks 14, is mounted for rotation relatively to the outward end of the load arm 30 on bearing shafts 43, and that this rotation is contributed by a hydraulic motor 72 carried by the bracket B. It is well to appreciate further that it is extremely simple, in the combination illustrated, to contribute additional side motion of the forks 14, pivotal motion of the forks 14, and even levelling movement of the forks, all as has been well set forth above.

Let us now assume that the forks 14 of the load fork assembly 44 face forwardly of the truck in longitudinal alignment therewith, and that the load arm 30 is in the position of FIGS. 1 and 2 in alignment with the longitudinal axis of the truck. This is a position of the parts that should be avoided when the truck is loaded in order to preserve stability of the truck. Let us now assume that it becomes desirable to lift a load facing the upper or left side of the truck, as it is shown in FIG. 2, and therefore, it is required that the forks 14 be in a position of FIG. 3. The load fork assembly 44 will be rotated by the motor 72 as shown by the arrow entitled "To FIG. 3" in FIG. 2 as the arm base 20 is shifted downwardly by the motor 25. If the line Z–Z in FIGS. 2 and 3 represents the line of greatest possible stability of the load, it will be seen that the forks 14 are as close to the line Z–Z in FIG. 3 as it is possible to place them. The center of gravity of a load being carried on the forks 14 will likewise be maintained in a close relationship to the truck. The stability of the truck at any position of the forks 14 will be comparable to a conventional truck having a fixed load support. The arm base 20 in FIG. 3 may readily be moved upwardly parallel to line Z–Z so that the forks will be positioned beyond the truck to accept a load at one side of the truck by means of the motor 25. The forks may thereafter be moved back to the position of FIG. 3 with the load thereon. The load will always be close to line Z–Z and in a very stable position.

Figure 5:
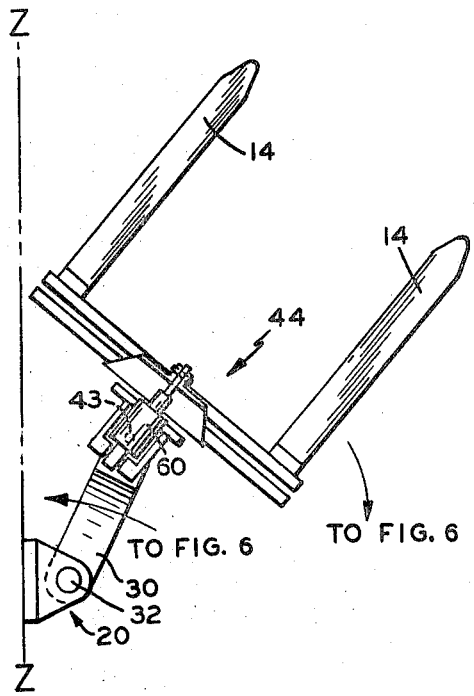
FIG. 5 illustrates the movement of the load arm in a counterclockwise direction from its position of FIG. 3, while the forks are moving in a clockwise direction relatively to the load arm, therefore enabling the load to be as close to the line Z-Z, representing the line of maximum stability, as is possible.
Figure 6:
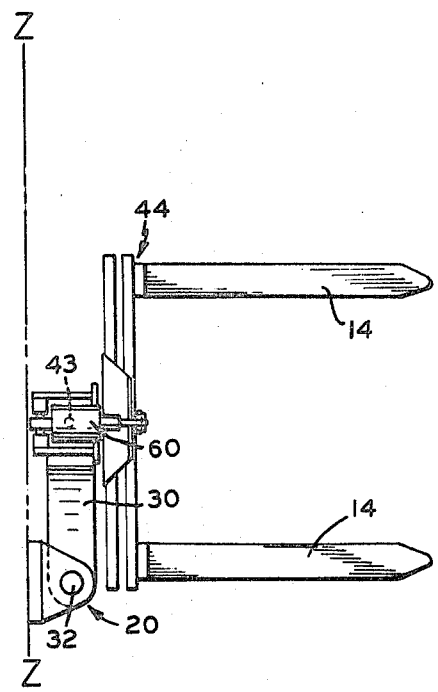
FIG. 6 illustrates the position of the load arm and the forks after being rotated beyond the position of FIG. 5 so as to face the load forwardly of the truck.

Let us assume now that with a load on the forks 14 in FIG. 3, it is desired to rotate the forks so that they will face forwardly as in FIG. 6 with the load as close to the line Z–Z as possible, in order to maintain stability. For the particular purpose the operator will now actuate the motor 35 so as to rotate the arm 30 from the position of FIG. 3 relatively to the arm base 20 in the direction of the arrow noted "To FIG. 5." At the same time, the operator will bring about actuation of the motor 72 for rotating the load fork assembly 44 clockwise in the direction of the arrow at the right-hand side of FIG. 3 marked "To FIG. 5."

Referring now to FIG. 5, it will be seen that some rotation of the load arm 30 relatively to arm base 20 has taken place, and that some rotation clockwise of the load fork assembly 44 relatively to the load arm 30 has also taken place. It will be noted also, that while there has been this rotation of both the load arm and the load forks, a generally central portion of the load forks is quite close to the line Z–Z so that it may be said that in the position of FIG. 5 the fork assembly 44 is as close to the line of maximum stability as it is possible to place it during rotation of the load forks from the position of FIG. 3 toward the position of FIG. 6.

Referring now to FIG. 6, it may be seen that the load fork assembly 44 has rotated further clockwise relatively to the load arm 30 into one extreme position, and that the forks 14 now face forwardly in alignment with the longitudinal axis of the truck. It will be noted that the load arm 30 is now transverse of the truck. It will further be noted, that the load forks assembly and its load will be as close to the line of maximum stability Z–Z as it is possible to place them in view of the necessity for having some means for supporting the load and for rotating the load. Clearly arm 30 may move with arm base 20 transversely of the truck if required.

Figure 7:
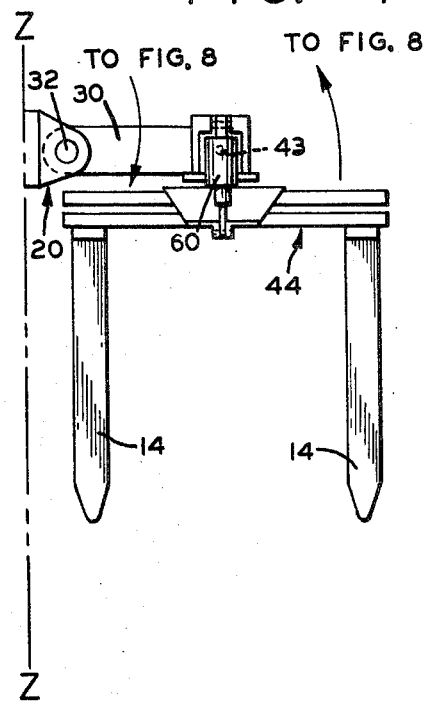
FIG. 7 is a partial view of certain parts of FIG. 3 but with the forks shown facing in a direction opposed to that of FIG. 3.

In FIG. 7 we show the parts in exactly the same relation to the truck as in FIG. 3, except that while the load arm 30 is parallel to the longitudinal axis of the truck, the load fork assembly 44 is positioned to face the forks 14 in a direction opposite their position in FIG. 3, so that a load may be accepted at the right-hand side of the truck. Let us now consider just how the operator may face the forks 14 forwardly, bringing them to the position of FIG. 8, which is exactly the same position of the forks as in FIG. 6, except that the load arm 30 extends in the opposed direction so as to make possible a better manipulation of the forks at the one side of the truck.

Figure 8:
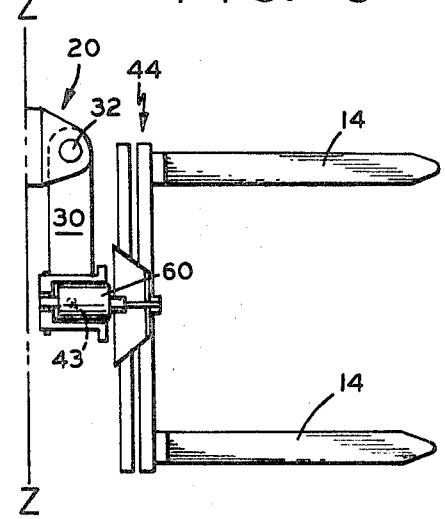
FIG. 8 illustrates just how the load will be positioned facing forwardly of the truck when the load arm rotates clockwise from its position of FIG. 7 as the forks are rotated counterclockwise from the position of FIG. 7, this contributing to the maintenance of the load as close to the line Z-Z as possible.

For the particular purpose, therefore, the load arm 30 is rotated from the position of FIG. 7 to the position in FIG. 8 in the direction of the arrow designated "To FIG. 8." Obviously this is a clockwise rotation. On the other hand, the load fork assembly 44 will be rotated in a counterclockwise direction relatively to arm 30 along the direction of the arrow noted "To FIG. 8." The consequent rotation of the load arm 30 and the load fork assembly will be in a manner to hold the load arm and the load fork assembly in such particular relation to one another that the load forks will at all times be as close to the line Z–Z as is possible. Actually, the rotation will be along the lines set forth in FIG. 5, except in an opposite direction.

It will be appreciated that before, after, or during the rotation of the load fork assembly 44 and the load arm 30, the arm base itself may be moved transversely through operation of the hydraulic motor 25. While frequently it may be desirable to bring about simultaneous rotation of the three motors 25, 35 and 72, or simultaneous rotation of only the motors 35 and 72, it is many times required to rotate only the motor 25 in order to obtain lateral motion of the load arm and fork assembly for accepting a load at one side or the other of the truck, and for moving the load toward the central portion of the truck.

Figure 9:
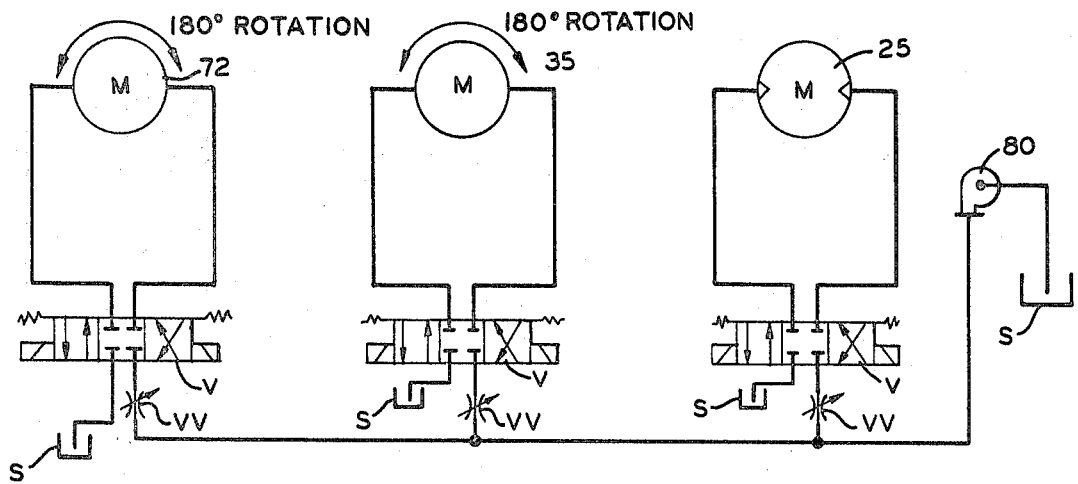
FIG. 9 is a schematic view of a hydraulic circuit that will make possible the simultaneous automatic movement of the forks, the load arm, and the arm base.

While is is possible to control the several motors 25, 35 and 72 in many ways, as will be apparent to those skilled in the art, we have shown in FIG. 9 one preferred form of the invention in which the three motors are connected in parallel to a pump 80. Each of the motors empties into a sump S which is common to the several motors and the pump 80. A solenoid valve V is used for controlling each of the motors, each valve being movable by the operator readily to shut off the flow of fluid to any of the motors, or to reverse the direction of movement of the motors. The valves per se are well known, and it is only their presence in the particular combination we have illustrated, that appears rather novel.

A volume valve VV is also used for each of the motors, it being the purpose of the valve VV to determine the amount of fluid that will flow into each motor when the pump 80 is operated in order to determine the relative speed of rotation of the motors when all the motors or some of the motors are operated together.

It is obvious in FIG. 9 that the pump 80 will bring fluid from the sump S and will move it under the control of three volume control valves VV into each of the three motors 25, and that the direction of rotation of each of the motors can readily be determined by its solenoid valve V. Therefore, almost any type of operation of the motors to cause swinging movement of the load arm and the load fork assembly relatively to one another and the truck may be obtained. Full automatic operation required to hold the load as described with regard to FIGS. 5 and 6 will be achieved by proper setting of valve VV for motors 35 and 72. Independent sliding motion of the arm base 20 relatively to the carriage C may readily be controlled as required.

Figure 10:
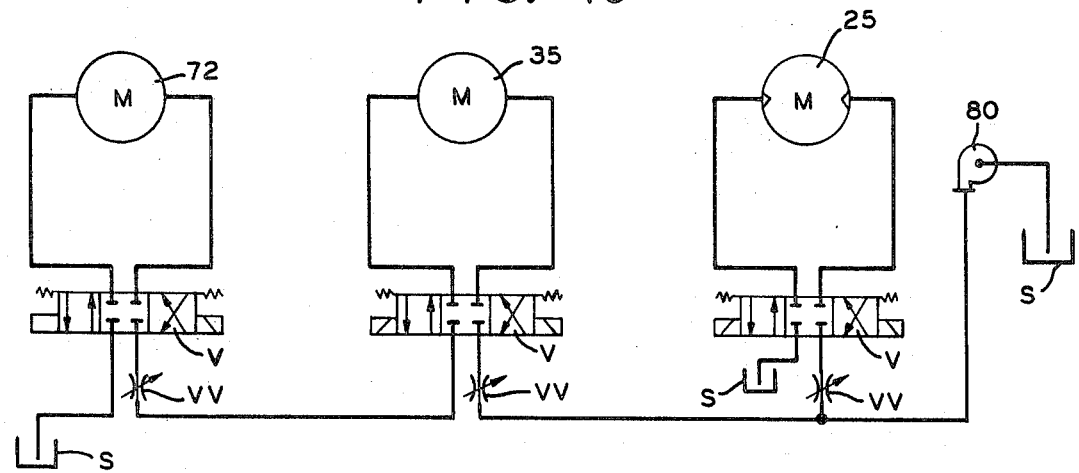
FIG. 10 is a view similar to that of FIG. 9, showing a further arrangement of the parts but with certain hydraulic motors arranged in series rather than in parallel as in FIG. 9.

In FIG. 10 the hydraulic motor 25 is shown in the same relation to the pump 80 as in FIG. 9. Thus, the motor will receive fluid from the pump 80 under the control of the valve V and the volume control valve VV. However, the two motors 35 and 72 are in series in FIG. 10, and will operate in a particular predetermined relation with one motor receiving its fluid entirely from the other motor. With the arrangement shown in FIG. 10, the volume of fluid received by the motor 72 will be entirely dependent on the flow of fluid through the motor 35, although the valve VV controlling the motor 72 may be further adjusted so that the motor 72 will receive only part of the fluid flowing from the motor 35, should that become necessary.

It will now be appreciated that through a particular arrangement of valves, it is possible for the operator to close the circuit of the motor controlling the pump 80 so that the driving of the pump 80 will automatically bring about a related motion of the arm base 20 relatively to the carriage C, a rotation of the load arm 30 relatively to the arm base 20, and the rotation of the load fork assembly 44 relatively to the load arm 30.

We do believe that the rather considerable contributions of our invention relatively to the prior art, and relatively also to the construction of the earlier noted application will now be fully appreciated.

We claim:
1. For use with a truck of the class described:
a carriage;
an arm base mounted on the carriage for generally horizontal movement therealong;
first means for moving the arm base along the carriage;
a load arm pivotably mounted on said arm base;
second means for pivoting the load arm relatively to the arm base;
a load carrier pivotably mounted on the load arm;
third means for pivoting the load carrier relative to the load arm;
a frame pivotably mounted on the load arm;
a load fork slidably mounted on the frame; and
fourth means operatively associated with the frame and the fork for moving the load fork horizontally along the frame.

2. The combination of claim 1, wherein the load arm further comprises:
a first beam pivotably mounted on the arm base for pivotal movement about a vertical axis;
a second beam pivotably mounted on the first beam for pivotal movement about a horizontal axis; and
fifth means for pivoting the second beam about said horizontal axis.

3. The combination of claim 1, wherein the first means, the second means and third means are operatively interconnected and including control means for synchronously controlling the operation of the first means, second means and third means.

4. In a truck of the class described including a wheeled frame section and vertical upright thereon, the improved combination comprising:
a carriage mounted on the upright for substantially vertical movement therealong;
an arm base mounted on the carriage for horizontal movement thereacross;
a load arm pivotably mounted about a substantially vertical axis on the arm base for pivotal movement with respect thereto;
a load carrier pivotally mounted about a substantially vertical axis on the load arm for pivotal movement with respect thereto; and
hydraulic means for effecting controlled relative compound movement between the load carrier and the carriage.

5. The combination of claim 4 wherein the load arm further comprises:
a first beam pivotably mounted on the arm base;
a second beam pivotably mounted on the first beam for pivotal movement about a substantially horizontal axis; and
means for effecting pivotal movement between the first and second beams.

6. The combination of claim 4 wherein the arm base, load arm and load carrier are synchronously driven by the hydraulic means.

7. The combination of claim 6 wherein the hydraulic means comprise;
first means for moving the arm base along the carriage;
second means for pivoting the load arm relative to the arm base and hydraulically connected to the first means in parallel;
third means for pivoting the load carrier relative to the load arm and hydraulically connected to the second means in series;
a pump for supplying hydraulic fluid to the first means; and
a control valve for regulating hydraulic fluid flow from the pump to the first means.

8. The combination of claim 4 wherein the load carrier comprises:
a frame pivotably mounted on the load arm;
a load fork slidably mounted on the frame; and
means operatively associated with the frame and the fork for moving the fork along the frame.